United States Patent
Symons et al.

(10) Patent No.: US 6,608,116 B2
(45) Date of Patent: Aug. 19, 2003

(54) POLYMERIC CLOSURE COMPRISING FOAMED POLYETHYLENE OR ETHYLENE COPOLYMER AND A RESILIENT COMPOUND

(75) Inventors: John Martin Symons, Woodville (AU); William James McMahon, Elsternwick (AU)

(73) Assignee: Anthony Smith Australia Pty Ltd, South Australia (AU)

(*) Notice: Subject to any disclaimer, the term of this patent is extended or adjusted under 35 U.S.C. 154(b) by 117 days.

(21) Appl. No.: 09/808,403

(22) Filed: Mar. 14, 2001

(65) Prior Publication Data

US 2002/0010225 A1 Jan. 24, 2002

Related U.S. Application Data

(63) Continuation of application No. PCT/AU99/00767, filed on Sep. 14, 1999.

(30) Foreign Application Priority Data

Sep. 15, 1998 (AU) .............................. PP 5919

(51) Int. Cl.$^7$ ................................. C08J 9/00
(52) U.S. Cl. ........................ 521/134; 521/144
(58) Field of Search ............................. 521/134, 144

(56) References Cited

U.S. PATENT DOCUMENTS

| | | | | |
|---|---|---|---|---|
| 3,400,866 A | 9/1968 | Fattori | ........................ | 222/511 |
| 3,443,728 A | 5/1969 | Scholle | ........................ | 222/511 |
| 3,779,965 A | 12/1973 | Lefforge et al. | ........ | 260/28.5 B |
| 3,972,452 A | 8/1976 | Welsh | ........................ | 222/501 |
| 3,984,022 A | 10/1976 | Babiol | ........................ | 215/355 |
| 4,042,543 A | 8/1977 | Strickman et al. | ...... | 260/17.4 R |
| 4,048,254 A | 9/1977 | Hillier et al. | ............ | 360/859 R |
| 4,085,186 A | 4/1978 | Rainer | ........................ | 264/268 |
| 4,091,136 A | 5/1978 | O'Brien et al. | ............ | 428/141 |
| 4,117,035 A | 9/1978 | Hillier et al. | ............ | 260/876 B |
| 4,188,457 A | 2/1980 | Throp | ........................ | 428/542 |
| 4,363,849 A | 12/1982 | Paisley et al. | ............ | 428/318.8 |
| 4,499,141 A | 2/1985 | Paisley et al. | ............ | 428/318.8 |
| 4,507,405 A | 3/1985 | Paisley et al. | ............ | 521/84.1 |
| 4,522,856 A | 6/1985 | Paisley et al. | ................. | 428/64 |
| 4,529,740 A | 7/1985 | Trainor | ........................ | 521/84 |
| 4,570,826 A | 2/1986 | Fattori | ........................ | 222/83 |
| 4,743,636 A | 5/1988 | Bersano | ........................ | 524/16 |
| 4,787,538 A | 11/1988 | Fattori | ........................ | 222/511 |
| 4,847,150 A | 7/1989 | Takeda | ........................ | 428/318.8 |
| 4,882,378 A | 11/1989 | Himes | ........................ | 524/505 |
| 5,317,047 A | 5/1994 | Sabate et al. | .................. | 524/16 |
| 5,496,862 A | 3/1996 | Burns | ........................ | 521/50 |
| 5,641,573 A | 6/1997 | Collins | ........................ | 428/409 |
| 5,770,318 A | 6/1998 | Friedman | .................... | 428/500 |
| 5,904,965 A | 5/1999 | Noel et al. | .................. | 428/36.5 |
| 6,153,275 A | 11/2000 | Yaniger | .................... | 428/34.4 |

FOREIGN PATENT DOCUMENTS

| | | | |
|---|---|---|---|
| AU | 42862/78 | 8/1979 | ............ F16K/1/18 |
| AU | 57420/86 | 12/1986 | ............ C09K/3/10 |
| AU | 76721/94 | 6/1995 | ............ B05D/3/08 |
| DE | 3940461 | 6/1991 | ........... B65D/39/00 |
| DE | 4225902 | 2/1993 | ........... B65D/39/00 |
| EP | 0051277 | 5/1982 | ........... B29D/27/00 |
| EP | 0051523 | 5/1982 | ........... B65D/39/00 |
| EP | 0156957 | 10/1985 | ........... B29C/67/22 |
| EP | 0798225 | 10/1997 | ........... B65D/41/28 |
| FR | 2254486 | 7/1975 | ........... B65D/39/00 |
| GB | 1196125 | 6/1970 | ............ C08I/47/00 |
| GB | 1196127 | 6/1970 | ........... C08F/43/08 |
| JP | 50058155 | 9/1973 | |
| JP | 50-058171 | 5/1975 | |
| UA | 2040889 | 9/1980 | ........... B65D/39/00 |
| WO | 87/07903 | 12/1987 | ........... C08L/23/02 |
| WO | 92/12848 | 8/1992 | ........... B29C/67/20 |
| WO | 94/25513 | 11/1994 | .............. C08J/9/00 |
| WO | 96/18678 | 6/1996 | ........... C08L/23/06 |
| WO | 97/33935 | 9/1997 | .............. C08J/9/04 |
| WO | WO-98/47783 | 10/1998 | ........... B65D/39/00 |
| WO | WO-99/06293 | 2/1999 | ........... B65D/39/00 |
| WO | WO-99/17631 | 4/1999 | ........... A44B/18/00 |

OTHER PUBLICATIONS

*Extracts from BASF Plastics's "Film Extrusion" Publication*, pp. 67–72, (Apr. 1992).
*Kraton D/G Sealants and Adhesives Properties Guide*, Shell Chemical Company, 7 p., (Feb. 1983).
*Processing and Fabricating Kraton Thermoplastic Rubber Compounds*, Kraton Thermoplastic Rubber, Shell Chemical Company, pp. 1–25, (1993).
Product Brochure—"Bottleneck Solutions: National Reaction to Cellukork Overwhelming", Lermer Packaging Corporation, 6 p., (1992).
*The Wiley Encyclopedia of Packaging Technology*, M. Bakker, Ed., John Wiley & Sons, 6 p., (1986).
"Clariflex TR–1000 Polymers for Adhesives, Coatings and Sealants", *Shell Elastomers, Thermoplastic Rubbers Technical Manual TR 5.1*, Shell Elastomers, pp. 1–24, (1993).
"Clariflex TR–4000 Compounding and Formulation", *Shell Chemicals*, Technical Bulletin, 6 p., (1993).
"Hercuprene Thermoplastic Elastomers: Meet J–Von", *J–Von Limited*, 25 litchfield Street, Leominster, MA 01453, 8 p.,.

(List continued on next page.)

*Primary Examiner*—Morton Foelak
(74) *Attorney, Agent, or Firm*—Schwegman, Lundberg, Woessner & Kluth, P.A.

(57) ABSTRACT

A foamed closure for a container, wherein the closure consists essentially of (a) a major proportion of at least one material selected from the group consisting of polyethylene and copolymers of ethylene; and (b) a minor proportion of at least one resilient compound. The resilient compound is preferably selected from the group consisting of polyethylene, metallocene catalyzed polyolefins, ethylene vinyl acetate copolymers, styrene-butadiene-styrene copolymers or styrene-ethylene-butylene-styrene copolymers.

25 Claims, No Drawings

OTHER PUBLICATIONS

"Shell Elastomers: Clariflex TR for Rubbery Sheeting", *Shell Chemicals, Thermoplastic Rubbers Technical Manual TR 7.2*, Technical Bulletin, 7 p., (1993).

"What is KRATON Rubber?", *Kraton Thermoplastic Rubber*, Shell Chemical Company, 10 p., (1990).

Adcock, E.P., "Chapter 25: Closures", *In: Packaging Materials and Containers*, Blackie & Son Limited, London, pp. 360–375, (1967).

Arnold, R.L., et al., "Chapter 7: Thermoplastic Elastomers", *In: Handbook of Plastics, Elastomers, and Composites, Second Edition*, C.A. Harper, Ed., McGraw–Hill, Inc., pp. 7.1–7.47, (1992).

Ash, M., et al., *Handbook of Plastic Compounds, Elastomers, and Resins*, pp. 623–635, (1992).

Blitshteyn, M., et al., "Surface treatment of polyolefins", *Modern Plastics Encyclopedia*, 1 p., (1994).

Bonk, H.W., "Thermoplastic Elastomers", *Modern Plastics Encyclopedia*, 4 p., (1984–1985).

Casey, J.A., "A simple test for tainted corks", *The Australian Grapegrower & Winemaker*, p. 40, (Dec. 1990).

Casey, J.A., "Closures for wine bottles—a user's viewpoint", *The Australian Grapegrower & Winemaker*, p. 99–107, (Apr. 1989).

Casey, J.A., "Cork as a closure material for wine", *The Australian Grapegrower & Winemaker*, p. 36–41, (1993).

Casey, J.A., "Flexible packages for wine", *The Australian Grapegrower & Winemaker*, pp. 57–63, (Apr. 1989).

Casey, J.A., "Packaging Materialf for the Wine Industry", *The Australian Grapegrower & Winemaker*, pp. 18–22, (Dec. 1989).

Casey, J.A., "The Cork Paradox", *The Australian Grapegrower & Winemaker*, Annual Tecnhical Issue, p. 15–20, (1998).

Casey, J.A., "The Enigmatic Properties of Cork", *The Australian Grapegrower & Winemaker*, pp. 83–88, (Apr. 1991).

Casey, J.A., "The packaging of wine in Australia", *The Australian Grapegrower & Winemaker*, p. 25–29, (Dec. 1990).

Edenbaum, J., "Chapter 13: Compounding Styrene–Butadiene–Styrene Block Copolymers: Styrenic Thermoplastic Elastomers", *In: Plastics Additives and Modifiers Handbook*, J. Edembaum, Ed., Chapman & Hall, (Apr. 1992).

Haws, J.R., et al., "Block Polymers", *Handbook of Thermoplastic Elastomers, Chapter 3*, B.M. Walker, Ed., Van Nostrand Reinhold Company, pp. 72–102, (1979).

Kraus, G., et al., "Applications of Elastomeric Diene–Styrene Block Copolymers", *In: Block Copolymers: Science and Technology*, Meier, D.J., Ed., Harwood Academic Publishers for MMI Press, United Kingdom, pp. 167–195, (1983).

Legge, N.R., "Thermoplastic Elastomers", *In: Rubber Chemistry and Technology, 60*, p. G79–G117, (1987).

Legge, N.R., "Thermoplastic Elastomers—Three Decades of Progress", *Rubber Chemistry and Technol., 62* (2), pp. 529–547, (1989).

Noshay, A., et al., *Block Copolymers: Overview and Critical Survey*, Academic Press: New York, pp. 17–465, (1977).

POLYMERIC CLOSURE COMPRISING FOAMED POLYETHYLENE OR ETHYLENE COPOLYMER AND A RESILIENT COMPOUND

CROSS-REFERENCE TO RELATED APPLICATIONS

This application is a continuation of PCT/AU99/00767, filed on Sep. 14, 1999, which in turn is an international filing of Australian Application Number PP 5919, filed on Sep. 15, 1998. The PCT/AU99/00767 application is herein incorporated by reference.

FIELD OF THE INVENTION

The present invention relates to closures of the type used to close off and seal containers, particularly containers having a relatively narrow opening such as liquid containers.

The closures of the present invention may be classified as internal closures or as external closures—internal closures are those which have at least a part thereof configured for engagement with an internal portion of a container, and external closures are those which make no contact with the interior of a container.

The present invention relates most particularly to non-threaded, internal closures for use with liquid containers having relatively narrow necks and thus relatively narrow openings. Such container may be wine bottles, champagne bottles, liqueur or spirit bottles, or other similar containers for beverages, and such internal closures are commonly referred to as stoppers.

However, it must be appreciated that the closures of the present invention are to be in no way limited to only these types of closures for only this type of container.

BACKGROUND OF THE INVENTION

By far the most commonly used material for such container closures is natural cork. However, natural cork closures have inherent performance problems that sometimes result in spoilage of the container's contents, be it loss of flavor, oxidation, tainting or leakage.

The wine closure industry in general has observed a phenomenon known as cork taint over many years. Industry estimates of the incidence of cork taint can range from a 1% to a 10% spoilage of bottled wines. The most common chemical associated with cork taint is 2, 4, 6 Trichloroanisole (TCA) which can affect wines at exceptionally low levels when they come into contact with infected cork.

Leakage of wine past the cork is another commonly observed problem and this can manifest itself in two ways. Firstly, the wine may travel through the main body of the cork due to imperfections and defects, particularly in the case of poor quality cork. Secondly, wine travel between the cork and the neck of the bottle can occur due to a lack of seal between the two surfaces. Such leakage may ultimately lead to oxidation of the contents of the bottle.

Natural cork performance is also related to the humidity or moisture content of the closure and the cork can loose its elastic properties if it dries out. Such a situation can lead to breakage and crumbling on extraction, resulting in particles of cork entering the contents of the container. Similarly, dust and small particles can also enter the wine after compression during the corking process due to cracks and imperfections in the cork.

In the past, problems such as these have generally been accepted as a necessary evil in the use of natural cork as the material of choice. However, in more recent times, different types of synthetic substitutes to natural cork have been developed. Thus, there have been attempts at developing closures made of synthetic materials, and many such developments have aimed at producing closures which do not exhibit the same performance problems which are known to be inherent in natural cork closures.

It is an aim of the present invention to produce a closure which would be an acceptable substitute for natural cork closures, whilst reducing or removing the properties that tend to induce spoilage.

SUMMARY OF THE INVENTION

In the past, manufactures of synthetic closures have often failed to understand the precise nature of the problems that exist in developing an acceptable substitute for natural cork closures. However, the present invention has arisen as a result of the identification and understanding of these problems by the present inventors.

Indeed, the inventors have identified that the development of an acceptable substitute for natural cork is reliant on an understanding that the problem lies with the resistance to movement and frictional force created between the closure and the container wall, not with the permeability or chemical reactivity of the closure composition.

In this respect, most past attempts at developing suitable synthetic closures have centered on the use of materials which are chemically inert and/or which do not allow gas permeation into or out of the container. However, these properties are obvious matters of material selection that do not greatly effect the ultimate performance of the closure. In particular, it is relatively simple exercise for a skilled person to select a suitable plastic material that is chemically inert, and virtually every such suitable plastic material will be virtually gas impermeable due to the closure thickness which are used.

However, the present invention has identified that the crucial aspect of such closures performing successfully is their ability to rapidly seal with the wall of a container, and permanently maintain their position in the neck of the container until removal.

Accordingly, the present invention provides a foamed closure for a container, wherein the closure consists essentially of:

a blend of one or more copolymers of ethylene and one or more metallocene catalyzed polyolefins, there being a major proportion of the ethylene copolymers and a minor proportion of the metallocene catalyzed polyolefins.

The copolymers of ethylene may include ethylene polymerized with comonomers such as vinyl acetate, methyl acrylate and the like, where the comonomer imparts flexibility or softness to the polyethyle, and will preferably be ethylene vinyl acetate (EVA). In this respect, a combination of any one or more of these materials may be used.

The metallocene catalyzed polyolefins may be any such polyolefin which provides the closure with an ability to deform elastically. For example, in the application of an internal closure to a wine bottle or the like, elastic deformation allows for pressure to be exerted and maintained on the internal surface of the neck of the bottle for long periods. This pressure needs to be maintained for the expected shelf life of the contained liquid. The resilience of the closure also serves to minimize the effect of variations in the surface and dimensions of the neck on the sealing of the closure with the wall of the bottle. However, many materials used in the past have not had the required resilience, and thus may have provided an initial seal but have not provided an acceptable seal over time. Such materials have been materials that have deformed plastically, thereby relaxing the pressure exerted.

The metallocene catalyzed polyolefin is preferably a metallocene catalyzed polyethylene (such as Dow-"AFFINITY", Exxon-"EXACT", DuPont-"ENGAGE" or Mitsui-"INVOLVE", which is formed by polymerization of comonomers using a metallocene catalyst. The metallocene catalyst may alternatively be referred to in the art as a constrained geometry catalyst or a single site catalyst. Such metallocene catalyzed poly ethylene materials also have the advantage of being chemically inert.

In the broadest form of the invention, it will be appreciated that the percentage amounts of the components will vary according to the size of the closure and the grade selection of the component being used. However, reference to a "major proportion" in the preferred form of the invention is to be understood to mean that the one or more copolymers of ethylene are provided in an amount from about 60% to about 90% (by weight), preferably from about 65% to 80% (by weight) and more preferably from about 70% to 75% (by weight). In determining the percentage amount of the copolymers in any given composition, reference should be made to all materials present which are copolymers of ethylene.

Furthermore, in relation to the metallocene catalyzed polyolefins of the disclosure of the present invention, reference to a "minor proportion" in the preferred form is to be understood to mean that the polyolefins are provided in an mount from about 10% to about 40% (by weight). In determining the percentage amount of the minor component in any given composition, reference should be made to all materials present that are metallocene catalyzed polyolefins that allow the closure to deform elastically, thus providing the required sealing characteristics.

Therefore, the present invention also provides a foamed closure for a container, wherein the closure consists essentially of:

(a) from about 60% to about 90% (by weight) of one or more copolymers of ethylene; and
(b) from about 10% to about 40% (by weight) of a metallocene catalyzed polyolefin.

More preferably, the metallocene catalyzed polyolefin is provided in a minor proportion that is from about 10% to about 25% (by weight). In this respect, some materials that are suitable for use as the resilient compound (in terms of their resilience) may lead to undesired tainting and flavor modification of the contents of the container at levels above about 25% (by weight). For example, it has been found that the preferred metallocene catalyzed polyethylene is more suitably maintained at levels below about 24% (by weight).

The foamed closures of the present invention are formed by use of a blowing agent. The blowing agent reacts in the composition under heat and shear conditions to produce as gas, thus creating a cellular structure. The closure is thus referred to as being a 'foamed' closure. However, it should be appreciated that the closure itself does not contain any blowing agent, just the resultant cells—it is the composition from which the closure is formed that contains the blowing agent.

The blowing agent may be any suitable type of blowing agent and may be used in any suitable amount. For example, the blowing agent may be of the chemical type that decomposes when influenced by heat and that forms gaseous decomposition products, such as Boehringe's hydrocerol blowing agents. The blowing agent will most likely be used in an amount of up to about 3% (by weight). However, it will be appreciated that a skilled addressee will be able to determine a suitable type and amount of blowing agent, depending upon the nature and amount of the major component and the resilient compound, upon other ingredients used, and upon the molding method and conditions used.

It will be noted the term "consists essentially of" has been used in this specification. In this respect, a skilled addressee will appreciate that this term allows for the addition of normal additives, such as lubricants and coloring agents (such as pigments), although in relatively small amounts, such as amounts up to about 2 or 3% (by weight) for the coloring agent, and in trace amounts for the lubricants.

It will also be appreciated that fillers such as calcium carbonate and talc may be added in amounts that would normally be accepted for such components. Such additives are present to provide specific known benefits, rather that interact with the ethylene copolymers and/or the metallocene catalyzed polyolefins. However, if the fillers are added, care still needs to be taken as the presence of too much filler may alter the properties of a closure. For instance, amounts of filler over about 20% (by weight) may be undesirable due to a possibly detrimental effect on the cellular structure of the foamed closure. Closures formed in accordance with the present invention are thus soft and flexible. Indeed, it has been found in the preferred form of the invention that by using copolymers of ethylene as the major component, and by controlling the amount of the major component relative to the minor component in the blend, suitable softness is imparted to the closure, such that the hardness of the final compound, unfoamed, is in the desirable range of from 80 to 90 Shore A, and is preferably at about 85 Shore A. In this respect, it will be appreciated that a hardness that is considered desirable in one closure (for use in a particular style or configuration of container) may be unsuitable for another closure (for a different style or configuration of container).

It will also be appreciated that a closure which is too soft may result in the plunger (which inserts the closure) indenting the closure, or may cause the closure to creep or elongate under compressive forces, causing the closure to relax and reduce the sealing force. On the other hand, a closure that is too hard may not permit the insertion of a corkscrew, may cause the closure to turn in the bottle when turning the corkscrew, or may make extraction of the closure difficult.

Closures formed in accordance with the present invention are also resilient in that they are able to deform elastically, thus recovering their shape after compression. Indeed, it has been found that by using a metallocene catalyzed polyolefin, and by controlling the amount of the ethylene copolymers relative to the metallocene catalyzed polyolefins in the blend, suitable resilience is imparted to the closure. The resilience is preferably such that the flexibility of the final compound allows for the insertion and turning of a corkscrew, whilst also providing a suitable pressure against the neck of a container after compression of the closure during insertion. The resilience is also preferably such that the closure may be compressed again after extraction, to be re-inserted.

It has been found advantageous to incorporate a chamfer or radius to the ends of the closure to enable to correct entry and acceptable insertion into the neck of a bottle. The absence of such a chamfer may result in the closure not inserting centrally into the bottle, or in some cases causing the otherwise square edges of the closure to fold back on themselves leading to possible leakage. To achieve the desired effect, the ends of the closure may be chamfered at an angle of approximately 45° to overcome any variations in alignment of conventional corking machine jaws.

It will finally be appreciated that any known manufacturing method may be used to produce closures in accordance with the present invention. In particular, known extrusion or injection moulding techniques may be used.

One advantageous method of manufacture of closures in accordance with the present invention is by an injection moulding technique whereupon an accurately measured amount of molten and expandable thermoplastic material is forced into a cavity such that the material does not initially occupy all of the cavity but which eventually becomes filled as the material expands. Such expansion is caused by a blowing agent which is incorporated into the material blend and is activated by increasing temperature and shear force.

During the process of expansion the aerated material is forced into contact with the cavity walls which are generally chilled. Subsequently, the material in closest contact with the walls solidifies and forms a controlled thickness skin. The skin so formed then entraps the gas evolved by the blowing agent within the inner portion of the closure, leading to a foam-like central structure.

The closure will thus conform to the approximate size and shape of the cavity in which it was formed. The combination of the foam structure and the incorporation of a suitable combination of the major compound and the resilient compound will then produce an elastic and resilient article that will allow it to function successfully as a bottle closure.

In one embodiment of the injection moulding process, the bulk polymer resins are preferably mixed together and then blended with a pigment masterbatch and a blowing agent at the throat of the moulder.

The blend of components is preferably heated such that the moulding temperature is generally between 140° C. and 200° C. but preferably about 180° C. The blend is injected into the mould over a period generally between 0.1 and 3 seconds (but preferably about 1.4 seconds), and the blend is retained in the chilled cavity generally between 30 seconds and 120 seconds, but preferably between 40 and 60 seconds.

The molten material is preferably injected into the cavity through a single gate located at one end which causes it to form a continuous strand which randomly coils within the cavity and contacts itself continuously. The expansion of this material against the chilled walls of the cavity cause the strands to solidify leaving flow lines on the surface of the object.

The cavity is pressurised by injecting the material in at high speed and pressure and then allowing a portion of the entrapped air to be vented to the atmosphere in a controlled manner such that the expansion of the material is restrained. It is also desirable to maximise the injection pressure and minimise the injection time in order to form a consistent foam structure and avoid large interstitial holes.

Indeed, factors such as pressures, cycle times, venting and machine parameters are important to the nature and form of the final article and are manipulated accordingly by an operator skilled in the art.

After a period of time sufficient for the closure to harden, such that the ejection process will damage it, the mould is opened and the part mechanically removed.

DESCRIPTION OF PREFERRED EMBODIMENTS OF THE INVENTION

The present invention will now be described in relation to several preferred embodiments as illustrated by the following examples. However, it is to be understood that the following description is not to limit the generality of the above description.

In relation to all of the following examples, and indeed with reference to this entire specification, all percentages are given by weight and as a percentage of the total compound before the manufacturing process.

EXAMPLE 1

| COMPONENT | % (by weight) |
| --- | --- |
| Ethylene-vinyl acetate copolymer (EVA) (16% vinyl acetate content) | 75 |
| Metallocene catalysed polyethylene | 20 |
| Blowing agent masterbatch | 3 |
| Pigment masterbatch | 2 |

EXAMPLE 2

| COMPONENT | % (by weight) |
| --- | --- |
| Ethylene-vinyl acetate copolymer (EVA) (18% vinyl acetate content) | 65 |
| Low density polyethylene (LDPE) | 10 |
| Metallocene catalysed polyethylene | 20 |
| Blowing agent masterbatch | 3 |
| Pigment masterbatch | 2 |

EXAMPLE 3

| COMPONENT | % (by weight) |
| --- | --- |
| Ethylene-vinyl acetate copolymer (EVA) (14% vinyl acetate content) | 60 |
| Metallocene catalysed polyethylene | 25 |
| Blowing agent masterbatch | 3 |
| Pigment masterbatch | 2 |
| Filler (talc) | 10 |

EXAMPLE 4

| COMPONENT | % (by weight) |
| --- | --- |
| Ethylene-vinyl acetate copolymer (EVA) (18% vinyl acetate content) | 60 |
| Metallocene catalysed polyethylene | 25 |
| Blowing agent masterbatch | 3 |
| Pigment masterbatch | 2 |
| Filler (talc) | 10 |

EXAMPLE 5

| COMPONENT | % (by weight) |
| --- | --- |
| Ethylene-vinyl acetate copolymer (EVA) (14% vinyl acetate content) | 75 |
| Metallocene catalysed polyethylene | 20 |
| Blowing agent masterbatch | 3 |
| Pigment masterbatch | 2 |

EXAMPLE 6

| COMPONENT | % (by weight) |
|---|---|
| Ethylene-vinyl acetate copolymer (EVA) (16% vinyl acetate content) | 70 |
| Ethylene-vinyl acetate copolymer (EVA) (24% vinyl acetate content) | 10 |
| Metallocene catalysed polyethylene | 10 |
| Blowing agent masterbatch | 3 |
| Pigment masterbatch | 2 |
| Filler (talc) | 5 |

The functional performance of closures manufactured by the preferred injection moulding process as described above, and in accordance with each of the above examples, is expected to be the same or very similar.

In particular, it is envisaged that the closure of Example 1 may be more suitable for smaller closures due to its slightly lower hardness of about 83 to 86 Shore A, whereas the closure of Example 2 will have a slightly higher hardness of about 87 to 89 Shore A and may be better suited with larger closures. The higher hardness is primarily due to the presence of the LDPE, which is introduced in this example to reduce vinyl acetate content and thus cost.

Examples 3, 4 and 6 use a filler in order to reduce cost. In Examples 3 and 4, slightly greater amounts of the resilient compound (the metallocene catalyzed polyethylene) is thus required to improve the properties that may be reduced by the increased presence of a filler. Also, Example 6 is provided as an improvement over Example 5 as the level of the metallocene catalyzed polythylene is able to be lowered (whilst still maintaining desirable sealing properties) to be further away from the perceived taint threshold for this material of about 25%.

Formulations have also been trialled with quantities of both the major and minor components outside the ranges that have been found to be suitable. The following comparative examples are provided to illustrate this.

COMPARATIVE EXAMPLE 1

| COMPONENT | % (by weight) |
|---|---|
| Ethylene-vinyl acetate copolymer (EVA) (18% Vinyl acetate content) | 55 |
| Metallocene catalyzed polyethyle | 40 |
| Blowing agent masterbatch | 3 |
| Pigment masterbatch | 2 |

This formulation was found to produce a closure which functioned well in terms of sealing and extraction but imparted a taint to the contents of a container (wine) after only 48 hours contact.

COMPARATIVE EXAMPLE 2

| COMPONENT | % (by weight) |
|---|---|
| Ethylene-vinyl acetate copolymer (EVA) (18% vinyl acetate content) | 90 |
| Blowing agent masterbatch | 3 |
| Pigment masterbatch | 2 |
| Filler (talc) | 5 |

This formulation produced a closure that was very neutral and did not impart a taint or flavour modification to the contents of the container (wine) and also exhibited suitable extraction forces. However, the closure was ultimately found to leak due to excessive compression set and a lack of resilience.

Finally, it will be understood that there may be other variations and modifications to the matters described above that may also be within the scope of the present invention.

What is claimed is:

1. A foamed closure for a container, wherein the closure consists essentially of a blend of one or more copolymers of ethylene and one or more metallocene catalyzed polyolefins, there being a major proportion of the ethylene copolymers and a minor proportion of the metallocene catalyzed polyolefins.

2. A foamed closure according to claim 1 wherein the copolymers of ethylene are ethylene polymerized with comonomers, including vinyl acetate or methyl acrylate.

3. A foamed closure according to claim 1 wherein the metallocene catalyzed polyolefin is a metallocene catalyzed polyethylene.

4. A foamed closure according to claim 1 wherein the ethylene copolymers are present in an amount of from about 60% to about 90% (by weight).

5. A foamed closure according to claim 1 wherein the ethylene copolymers are present in an amount of from about 65% to about 80% (by weight).

6. A foamed closure according to claim 1 wherein the ethylene copolymers are present in an amount of from about 70% to about 75% (by weight).

7. A foaled closure according to claim 1 wherein the metallocene catalyzed polyolefins are present in an amount of from about 10% to about 40% (by weight).

8. A foamed closure according to claim 1 wherein the metallocene catalyzed polyolefins are present in an amount of from about 10% to about 25% (by weight).

9. A foamed closure according to claim 1 formed by use of a blowing agent in an amount up to about 3% (by weight).

10. A foamed closure according to claim 1 additionally including lubricants, coloring agents and/or fillers.

11. A foamed closure according to claim 1 wherein the closure is an internal closure for use with a liquid container having a relatively narrow neck.

12. A foamed closure according to claim 11 wherein the closure is a stopper for a wine bottle.

13. A foamed closure according to claim 1 wherein the closure is manufactured by injection molding techniques.

14. A composition for use in manufacturing a closure, wherein the composition consists essentially of a blend of one or more copolymers of ethylene, one or more metallocene catalyzed polyolefins, and a blowing agent, there being a major proportion of the ethylene copolymers and a minor proportion of the metallocene catalyzed polyolefins;
   wherein the ethylene copolymers are present in an amount of from about 60% to about 90% (by weight); and
   the metallocene catalyzed polyolefins are present in an amount of from about 10% to about 40% (by weight).

15. A compound according to claim 14 wherein the copolymers of ethylene are ethylene polymerized with comonomers, including vinyl acetate or methyl acrylate.

16. A compound according to claim 15 wherein the metallocene catalyzed polyolefin is metallocene catalyzed polyethylene.

17. A composition according to claim 14 wherein the ethylene copolymers are present in an amount of from about 65% to about 80% (by weight).

18. A composition according to claim 14 wherein the ethylene copolymers are present in an amount of from about 70% to about 75% (by weight).

19. A composition according to claim 14 wherein the metallocene catalyzed polyolefins are present in an amount of from about 10% to about 40% (by weight).

20. A composition according to claim 14 formed by use of a blowing agent in an amount up to about 3% (by weight).

21. A composition according to claim 14 additionally including lubricants, coloring agents and/or fillers.

22. A foamed closure for a container, wherein the closure consists essentially of a blend of:

(a) from about 60% to about 90% (by weight) of one or more copolymers of ethylene; and;

(b) from about 10% to about 40% (by weight) of metallocene catalyzed polyethylene.

23. A foamed closure according to claim 22 wherein the metallocene catalyzed polyethylene is present in an amount of from about 10% to about 25% (by weight).

24. A foamed closure according to claim 22 wherein the copolymer of ethylene is ethylene vinyl acetate.

25. A foamed closure for a container, wherein the closure consists essentially of a blend of one or more copolymers of ethylene and one or more metallocene catalyzed polyolefins, there being a major proportion of the ethylene copolymers and a minor proportion of the metallocene catalyzed polyolefins;

wherein the ethylene copolymers are present in an amount of from about 60% to about 90% (by weight); and the metallocene catalyzed polyolefins are present in an amount of from about 10% to about 40% (by weight).

* * * * *